Dec. 16, 1941.   L. H. HOLDER   2,266,321
ROOF COOLING DEVICE
Filed June 4, 1940
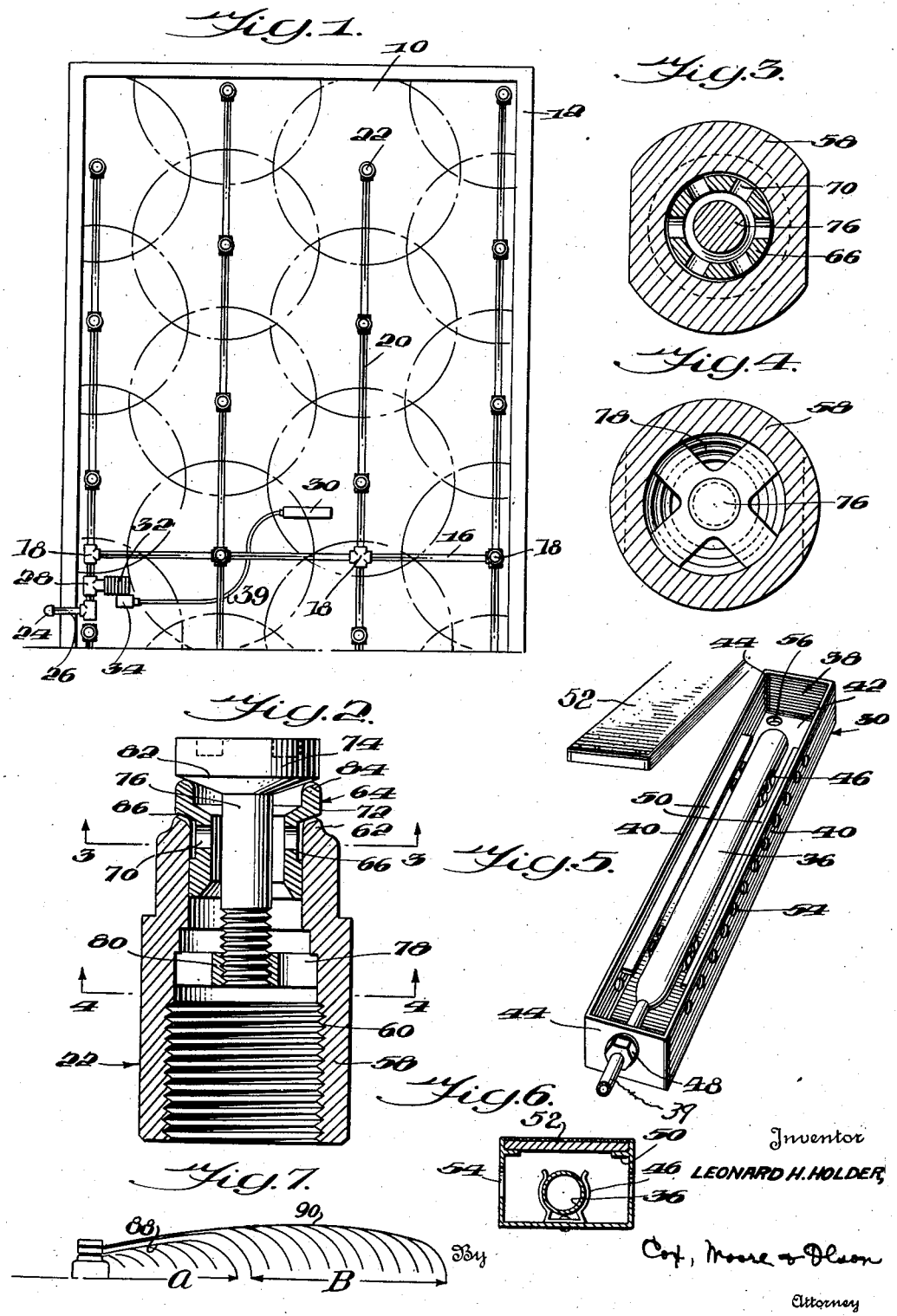
Inventor
LEONARD H. HOLDER,
By Cox, Moore & Olson
Attorney Patented Dec. 16, 1941

2,266,321

UNITED STATES PATENT OFFICE 2,266,321

ROOF COOLING DEVICE

Leonard H. Holder, Washington, D. C.

Application June 4, 1940, Serial No. 338,811

17 Claims. (Cl. 62—6)

The present invention relates to the prevention of excessive heat accumulation in exposed surfaces such as roofs and contemplates particularly the controlled dissipation of heat through the agency of latent heat of vaporization of a suitable liquid such as water.

The present invention more particularly contemplates the complete utilization of the entire theoretical evaporative cooling effect available in resisting the absorption of heat by exposed roof surfaces and particularly comprehends the abstraction of absorbed heat in the said surfaces before the heat energy has had an opportunity to pass appreciably into the building interior. In the past, efforts to cool or to prevent heating of exterior surfaces by the utilization of moisture have frequently depended in part upon the volumetric cooling effect of the water employed and while some evaporation has occurred, the cooling resulting from this effect has operated only in a minor degree to lower the temperature of the surfaces. In any case, however, the evaporative cooling effect has been largely destroyed by the necessity for cooling the water, which possesses a large heat absorbing capacity. Accordingly, therefore, the large quantities of water to secure any appreciable cooling effect have rendered this method impracticable except in those instances where large quantities of cold water are available.

It is an important object of the present invention, therefore, to provide an improved cooling and heat dissipation system wherein a substantially perfect evaporative efficiency is maintained by utilizing the entire available latent evaporative heat absorptivity of water or other liquid under controlled conditions.

A further object of the present invention contemplates the controlled evaporation of liquid directly upon exposed surfaces to be cooled and within a narrow predetermined range of temperature favorable to the instant transmission of the cooling effect to the exposed exterior surfaces and operative continuously to prevent any substantial degree of heat absorption. It has been observed that the application of very restricted sprays to a roof surface exposed, for example, to summer sun conditions, results in an instantaneous evaporative effect, lowering the temperatures of these surfaces and the resultant flow of heat toward subjacent sections. With the continued application of spraying, however, a water layer is formed of regularly increasing section, thus necessitating the utilization of an increasing proportion of the evaporative effect in cooling the water. In short, from an initially high roof cooling efficiency, the action progressively and rapidly approaches the condition of low evaporative cooling efficiency wherein main reliance must necessarily be placed upon the cooling effect of the water per se. Where the coolant is not available in relatively cold condition, cooling efficiency is further decreased. So also, while a relative evaporative cooling effect may occur where the roof surfaces are excessively hot, it will be evident that where it is desirable to maintain a consistently low surface temperature a further corresponding decrease in efficiency is apparent which is particularly noticeable under adverse humidity conditions.

It is accordingly an additional object of the present invention to obviate the foregoing difficulties impeding the progress of the present art by providing a cooling system responsive to a minor elevation in roof surface temperature to effect evaporative cooling of the said surface under the initial wetting conditions of high cooling efficiency.

A further object of the present invention contemplates a system such as the above operable to terminate the supply of evaporative fluid as soon as operative conditions vary from those of maximum evaporative efficiency, and particularly the creation of an appreciable body of liquid moisture capable of absorbing a large portion of the evaporative heat energy and/or independently absorbing atmospheric and/or solar heat at undesirably high temperatures.

Yet other and further objects of my present invention are to provide a cooling and heat dissipating system as above adapted to maintain roof surface temperatures within a predetermined narrow range substantially equivalent to normal summer room temperature conditions in order to eliminate all heat transfer in a direction inwardly of the roof; to provide a system such as the foregoing capable of resulting in substantially perfect uniform distribution of liquid moisture under conditions effecting no appreciable increase in normal atmospheric humidity; to provide for the utilization of an evaporative cooling effect under the influence of normal atmospheric evaporative conditions and particularly in the absence of atmospheric spray after initially wetting of the roof surfaces; and to provide a cooling system and method employing the theoretical minimum of water and adaptable to the utilization of waste and condenser water delivered under widely varying temperatures.

Yet further objects and advantages will be apparent from the following description when taken in conjunction with the accompanying drawing, wherein:

Figure 1 is a plan view of a portion of a roof including an evaporative cooling construction embodying the principles of the present invention;

Figure 2 is a detail view taken centrally through a spray head of the type used in Figure 1;

Figure 3 is a horizontal sectional view taken through the spray head of Figure 2 on the line 3—3 thereof;

Figure 4 is a sectional view taken through the spray head of Figure 2 on the line 4—4 thereof;

Figure 5 is a perspective view of the temperature responsive control member; and Figure 6 is a sectional view taken sectionally and transversely through the device of Figure 5.

Figure 7 is a more or less diagrammatic view taken vertically adjacent the spray head and illustrating the trajectory of the particles distributed thereby.

Referring now to Figure 1 of the drawing, I have represented a roof as indicated by the reference numeral 10 comprising a peripheral coping 12 and a central roof surface 14 of any conventional flat roof construction. Thus, the surface 14 may comprise slag, tar or so-called roofing paper or composition, but in the present description, for illustrative purposes, will be considered as a composition roofing material. Upon the roof surface, there is disposed a pipe conduit system comprising a main conduit 16 having a plurality of T-fittings 18 from which laterally project branch tubes or conduits 20. It will be seen that the foregoing pipe system supplies a series of spray heads 22 disposed in a predetermined pattern for distributing liquid uniformly over the roof surfaces, each of the spray heads being operative to distribute moisture in solid streams and droplets about a circular area indicated by the dotted line circle in Figure 1. I have found it preferable in effecting the foregoing result to dispose the heads in a pattern such that they tend to reside at points forming an equilateral triangle with adacent spray heads and in this manner I have obtained a surprisingly uniform distribution of liquid. It will be understood that in the case of the spray heads disposed adjacent the coping I employ spray heads suitably restricted on all surfaces with the exception of those adapted to direct water inwardly over the roof surfaces.

The foregoing piping and spray system is in general similar to that disclosed in my Patent No. 2,069,150, wherein water is continuously sprayed upon a roof surface to effect cooling to resist the transmission of atmospheric solar heat by the provision of an adequate water supply irrespective of the atmospheric conditions. Accordingly, therefore, it will be appreciated that the spray heads 22 are preferably disposed on short risers or nipples.

In accordance with the present invention, the piping system is supplied with water under pressure through a standpipe 24, in this instance rising from the side of the building and connected at its upper end to a lateral supply pipe 26 extending into the main pipe line 16. It is particularly pertinent to point out that interposed between the main supply line 26 is an automatic valve 28 responsive to a control means 30. The details of the control valve have not been shown, since this may comprise any suitable valve movable from some continuously available source of power to restrict or open communication through the conduit 26. In other words, the valve comprises an element capable of being actuated to shut off or stop the flow of the liquid to the system. In the present instance, the valve comprises a construction 32 of the so-called motorized type having associated therewith a relay control box 34 and energized from any suitable source of electric current not shown. The control member 30 functions as a thermostatic or temperature responsive means to operate the relay and accordingly the motor in accordance with predetermined temperature conditions corresponding to temperatures existing at the outer or exterior roof surfaces and preferably comprises a construction such as shown in Figures 5 and 6. In accordance with these figures, it will be seen that the aforesaid construction comprises a temperature responsive member 36 disposed within an enclosing housing 38 and having a closed pressure conduit 39 extending to the control box 34 for actuating the relay. It is thought unnecessary to describe in further detail the construction of the temperature responsive means comprising the bulb 36, conduit 39 and control box 34, in view of the fact that such devices are known in the art. Suffice it to say that an expansible fluid within the sealed bulb 36 responds to temperature variation in the bulb to set up varying pressure conditions at the control box 34 for actuating the motorized valve 32. The valve may accordingly be caused to function at any predetermined temperatures of the member 36.

Attention is particularly directed to the fact that the housing 38 comprises elongated side walls 40, the bottom wall 42 and end walls 44. Suitable clip supports 46 mounted on the bottom wall 42 dispose the temperature responsive member in spaced relation to the said lower wall of the housing and a suitable bushing 48 embraces the tube 39 where it passes through an end wall 44. Within the upstanding side walls 40 of the housing I have disposed a pair of inwardly projecting flanges 50 upon which rest a cover 52. It is particularly important to note that the cover 52 in the present instance is preferably formed of a material identical with the material forming the outer surface of the roof. This construction is based upon the concept of operating the water supply valve in response to the temperature of the outer roof surface. Accordingly, therefore, the control cylinder 36 is disposed within its housing in such a manner that the cover 52 immediately thereabove is exposed to solar conditions identical with those of the roof surfaces and accordingly subjects the heat responsive means 36 to identically simulated temperature conditions. To this end, therefore, the cover or layer 52 consists of a piece of surface roofing, for example, a layer of so-called composition paper or tar paper when the roof is thus coated or covered. It should be further noted that the walls of the housing 38 are freely apertured on opposite sides as at 54 and since the housing rests directly upon the roof it will be appreciated that the passage of air along the roof further contributes to the maintenance of accurate roof surface temperatures within the housing. Additional apertures 56 facilitate drainage during excessive atmospheric precipitation.

From the foregoing, it will be apparent that the present invention provides a cooling system wherein the water as distinguished from being continuously sprayed operates in response to predetermined surface temperature conditions on the exterior exposed roof surfaces for effecting a control of evaporation within a narrow range favorable to perfect evaporative efficiency and substantially complete transmission of the cooling effect to the building structure. To better illustrate the principles of the present invention let it be assumed that the automatic valve control mechanism is so adjusted as to supply water under pressure to the spray heads when the roof surface temperature reaches 90° F. and becomes immediately operative to stop the water supplied a roof surface temperature of 85° F. In operation, therefore, let it be assumed that the absorption of solar radiation proceeds to elevate the temperature. When a temperature of 90° F. is reached in the outer surface layer, the spray heads commence to operate, supplying a fine restricted distribution of droplets over the entire roof. I have observed that immediately with the deposition of moisture upon the dry surfaces, an instantaneous high efficiency evaporation occurs in which substantially the entire cooling effect is transmitted to said surfaces. Accordingly, therefore, there occurs a relatively rapid temperature drop. With the continued addition of water, however, the cooling rate and efficiency progressively decreases due, I conceive, to the heat absorptive capacity of the accumulating moisture. It will moreover be obvious that as evaporative cooling progresses, the roof surface temperature necessarily approaches wet bulb temperature, at which sensible cooling by evaporation ceases. I accordingly take advantage of the initial relatively efficient cooling effect by terminating application of water with a predetermined minor temperature drop, in the present instance corresponding to a drop of 5° F. and within the evaporative cooling range as determined by wet bulb temperature. Accordingly, therefore, any minute residual moisture on the surfaces remains available to cause a continued cooling effect until drying is molecularly complete. Absorption of radiated heat then recommences until the critical temperature of 90° F. is reached whereupon the device operates cyclically as before. It will be seen that the present system therefor operates in such a manner that interior roof spaces never reach a temperature over 85° F. and preferably appreciably therebelow.

It is particularly important to point out that the present invention contemplates the addition of moisture in restricted quantity such that either rapid or appreciable wetting does not take place, and proceeding in accordance with my invention, even at the time of closure of the main water valve, the roof surfaces are not noticeably or appreciably wet. Accordingly, therefore, it will be seen that the addition of a heavy volumetric spray of water would prevent full realization of all the advantages of the invention and prevent the rapid utilization of the cooling effect. To this end, therefore, the present spray distribution system preferably is so proportioned and designed that the rate of water application is restricted in accordance with predetermined rates of application. Thus, in accordance with the preferred embodiment of my invention, the operation of the spraying system functions to uniformly deposit and spray water in a quantity and at a rate equal to about .001 gallon of water per square foot of roof surface per minute. While the foregoing represents a preferred rate of addition, it is possible to secure somewhat analogous results, if the rate of water application is increased to the order of .002 or .003 gallon of water per square foot per minute. Where maximum utilization of the principles of the present cooling system is not as important a factor, I may employ spray heads so as to apply moisture as high as .005 and in some cases .010 gallon per square foot per minute.

It will be apparent from the foregoing that an inordinately small amount of moisture is employed, and that highest efficiency in carrying out the process is attained when utilizing the relatively smaller rate of water addition. When it is appreciated that during the warmest days of summer in hot climates and with solar radiation at its maximum, the present cooling system operating as described above supplies water during a few minutes only out of every hour, it will be seen that the water consumption is relatively insignificant. Thus, I have observed that when operating in accordance with the present invention, even under very severe conditions of high atmospheric temperatures, the restricted spray operating in response to the roof surface temperature, actively functions only from three to seven minutes during the hour.

It is preferred to employ means for effecting the foregoing uniform restricted spraying of the roof surfaces following the construction shown in Figures 2 and 3 where an outer cylindrical body 58 interiorly is threaded as at 60 adjacent its lower extremity to receive the end of a vertical pipe member. The upper end of the body is provided with a marginal upstanding control flange or lip 62 surrounding a central axial bore in which is received an annular unit comprising a baffle core 64. It will be seen that the baffle core is received axially within the central bore of the main body 58 having a lower annular peripheral wall portion 66 adapted to fit freely within the complementary bore. Just above the seat or landing portion 66 the baffle member is cut away radially inwardly to provide an annular channel 68 fed by means of a plurality of ports 70 in the adjacent wall. Axially above the channel 68, the baffle core is provided with outwardly and upwardly extending flanges 72 projecting over the lip portion 62. The baffle core is held permanently in place by means of a valve head member 74 having an elongated stem or shank extending axially into threaded engagement as at 80 with a spider 78 rigid with the main spray body 58. It should be particularly noted that the valve head unit has a conical or tapering undersurface 82 overlying an axially extending flange or lip 84 on the baffle core, although the surface 82 may be flat or inclined downwardly from the head axis where desired.

It is particularly important to note that the conical undersurface of this head, as well as the undersurface 86 of the baffle core overlying the lip or flange 62, cooperate with serrations in the respective lips to provide a plurality of axially and annularly disposed orifices. The individual orifices may be constructed in accordance with the disclosure of my foregoing Patent No. 2,069,150, wherein each of the serrations has walls which converge in a downward direction to confer a generally V-shaped sectional configuration upon the apertures. It is, moreover, of importance to note that the V-shaped serrations at their outer portions are arranged so that the confining walls of the orifice extend radially outwardly in the same direction. To this end, for example, the bottom of each serration at its mouth is exactly parallel with the superposed conical surface. According to another important feature pointed out in my foregoing patent, the bottom of the serration is so arranged as to make an increasingly acute angle with the central axis of the spray head as the serration progresses inwardly and as a result, the orifice aperture flares inwardly to accommodate and supply water freely to each opening. As a result of this construction and preferably when employing relatively low pressures of the order of ten pounds per square inch for example, the spray head effects a series of relatively nonturbulent streams of solid water which, as opposed to vaporizing the water in the form of an especially fine mist, would tend to deposit water in liquid form upon the predetermined roof area without intervening evaporation. To this end, I have observed that the relatively attentuated lower edge of each V-shaped stream progressively downwardly discharges individual drops or particles promoting uniform distribution.

It is of particular importance to point out that in accordance with the present invention I have provided a pair of axially disposed annular groups of serrations. While each of the serrations in the present spray head presents same general configuration, including the details hereinbefore mentioned, it is to be noted that the upper annular series of orifices is provided with a relatively increased sectional area which may be and preferably is from two to five times the depth and width. This construction is based upon my discovery that orifice constructions of the present type, while in the smaller dimensions tend to uniformly distribute water close to the nozzle or head, whereas in larger dimensions the resulting streams of water tend to distribute water a relatively substantial distance from the spray head before commencing to distribute moisture and accordingly are selectively available to spray over predetermined radially disposed outward areas. The present invention contemplates the relative selection of the upper and lower apertures or serrations such that each group selectively and individually waters such a selected area. The operation of the foregoing device is represented more or less diagrammatically in Figure 7 wherein it will be seen that the spray head for any one radial direction issues two parallel streams of water, the lower stream designated by the reference numeral 88 of which commences progressive disintegration immediately upon issue and terminating, as indicated, at a distance A from the spray head. The upper stream 90, it will be noted, however, deposits utterly no moisture until it has reached a point beyond the radial distance A, whereupon it has reached a condition enabling it to uniformly deposit moisture onto the roof as indicated, throughout the distance B. It has been observed that, when proceeding in accordance with the present construction, I am enabled to uniformly deposit moisture upon a roof surface over surprisingly great radial distances, permitting relatively wide spacing of the individual spray heads. It is to be particularly noted that the upper larger streams of moisture overlie the inner streams and operate coincidentally therewith.

It will be seen from the foregoing that I have provided a new and improved method for cooling roofs subjected to severe atmospheric heat absorption conditions by utilizing the high efficiency cooling effect available upon initial controlled application of moisture with the outer roof surfaces. More particularly, the present invention contemplates utilizing the cooling effect by effecting immediate cessation of controlled moisture application when the initially high efficiency increment of cooling has been effected, and thus permitting the complete evaporation of minute residual moisture on the surface and in the absence of further spray. In other words, the present invention utilizes the optimum cooling conditions by discontinued application of water spray responsive to initial cooling effect. It has been observed that the prior continuous application of a mist or spray of moisture results in a low cooling efficiency and in excessive water utilization even where it is attempted to rely largely upon the evaporative effect of the moisture. Thus, it will be appreciated that it is a practical impossibility to proportion the water exactly to the rate of evaporation because of the fact that the evaporative effect varies widely with such things as air humidity, temperature of water, rate of addition of water, sun intensity, roof temperature, wind velocity, and many other continuously varying factors. Moreover, the continued mist of spray may and frequently does create an artificial condition of humidity interfering with evaporation. In other words, the condition of wet bulb temperature is reached or approximated at the roof surface temperature causing cessation of sensible cooling by evaporation. The present invention obviates the foregoing difficulties, permits high efficiency of heat abstraction in accordance with temperature conditions prevailing in the outer roof surfaces.

Thus, the present invention depends upon the evaporative cooling and provides an automatic system whereby substantially the entire available latent heat of vaporization of the liquid is utilized for cooling the surface of the roof. As is obvious from the foregoing, therefore, the system necessarily operates accordingly to shut off water flow before the condition of wet bulb temperature is reached and thus at a temperature at which sensible cooling actually results from the evaporative effect. Moreover, it will be understood that at the wet bulb temperature or thereabouts the progressive restriction of the evaporative effect tends to result in accumulation of the water in puddles or streams on the roof. Thus, referring to the foregoing illustrative example wherein the apparatus is predesigned to shut off at a temperature of approximately 85° F. after a 5° temperature drop, it will be understood that these limits are selected in accordance with one relatively severe set of atmospheric conditions which may be met with in practice, and the temperature limit of valve operation may be varied in accordance with normal atmospheric conditions in the locality of the installation.

It is to be understood that the temperature responsive means which renders the present system operative in accordance with the actual roof surface temperatures may be varied in accordance with the type of roof to which the present system is applied. Thus, where another roof surfacing material is employed for the composition "paper" illustrated above, the heat absorptive member 30 will be provided with a substitute cover or upper wall 52 of corresponding material. When loose slag or gravel is employed in the roof I prefer merely to omit the cover and surround the cylinder or bulb 36 with a loose mass of slag particles in question. When employed upon copper roofs, I prefer to omit the top wall 52 entirely, in view of the fact that the heat responsive cylinder or bulb 36 normally is formed of copper, wherefore its heat absorptive characteristics are identical with those of the roof surface and is capable of effecting a very accurate control. I may employ the same type of control in the case of slate roofs.

Changes may be made in the form of construction and arrangement of parts without departing from the spirit of the invention or sacrificing any of its advantages, the foregoing preferred construction having been disclosed merely for illustrative purposes to enable one schooled in the art readily to comprehend the nature of the invention. The right is therefore reserved to make all such changes as fairly fall within the scope of the following claims.

The invention is claimed as follows:

1. In a roof cooling system for disposition upon an exposed roof surface, and comprising a plurality of spray heads disposed for substantially uniformly supplying a restricted uniform spray of moisture to said roof area, conduit means for supplying said spray heads with water at a restricted rate, and automatic valve means for said supply conduit, and control means for said valve comprising a heat responsive control unit located on said roof and operative under the influence of roof surface temperature conditions, said last named means being operative to open said supply valve at a roof surface temperature of about 90° F. and to close said valve after a temperature drop of substantially not over 5° F., said temperature responsive means being enclosed in a ventilated housing resting upon said roof and said housing having an exposed top cover portion comprising a material corresponding to the outer surface layer of the roof.

2. The combination with a roof having a surface exposed to atmospheric conditions, of a system for spraying such surface with a cooling liquid, said system comprising a set of spray means constructed and arranged to distribute said liquid substantially uniformly over said surface, means for supplying said liquid to said spray means and valve structure for controlling the flow to said spray means and including an element for stopping said flow, and a valve operating device including a thermostatic means mounted to be exposed to said atmospheric conditions acting to operate said valve element to permit the flow of said cooling liquid when the temperature of the roof reaches a predetermined value and to shut off such flow before the temperature of said surface falls below that value at which sensible cooling by evaporation ceases.

3. The combination with a roof having a surface exposed to atmospheric conditions, of a system for spraying such surface with a cooling liquid, said system comprising a set of spray means constructed and arranged to distribute said liquid substantially uniformly over said surface, means for supplying said liquid to said spray means and valve structure for controlling the flow to said spray means and including an element for stopping said flow, and a valve operating device including a thermostatic means mounted to be exposed to said atmospheric conditions acting to operate said valve element to permit the flow of said cooling liquid when the temperature of the roof reaches a predetermined value and to shut off such flow substantially before the temperature of said surface falls below that value at which sensible cooling by evaporation ceases.

4. A combination as defined in claim 2 wherein said system is constructed and arranged to supply moisture to said roof surface at a rate not over .010 gallon per square foot per minute.

5. A combination as defined in claim 2 wherein said system is constructed and arranged to supply moisture to said roof surface at a rate not over .005 gallon per square foot per minute.

6. A combination as defined in claim 2 wherein said system is constructed and arranged to supply moisture to said roof surface at a rate not over .001 gallon per square foot per minute.

7. The combination with a roof having a surface exposed to atmospheric conditions, of a system for spraying such surface with a cooling liquid, said system comprising a set of spray means constructed and arranged to distribute said liquid substantially uniformly over said surface, means for supplying said liquid to said spray means and valve structure for controlling the flow to said spray means and including an element for stopping said flow, and a valve operating device including a thermostatic means mounted to be exposed to said atmospheric conditions acting to operate said valve element to permit the flow of said cooling liquid when the temperature of the roof surface reaches approximately 90° F. and to shut off such flow before the temperature of said surface falls below that value at which sensible cooling by evaporation ceases.

8. The combination as defined in claim 2 wherein said thermostatic means is enclosed in a housing having an exposed top cover portion comprising a material corresponding to the outer surface layer of the roof.

9. The method of cooling a roof having a surface exposed to atmospheric conditions and a set of spray means constructed and arranged to distribute liquid in a fine spray uniformly over said surface, which comprises permitting flow of said cooling liquid to said spray means when the temperature of the roof reaches a predetermined value and shutting off the flow after a predetermined temperature drop and before the temperature of said surface falls below that value at which sensible cooling by evaporation ceases.

10. The method of cooling a roof having a surface exposed to atmospheric conditions and a set of spray means constructed and arranged to distribute liquid in a fine spray uniformly over said surface, which comprises permitting flow of said cooling liquid to said spray means when the temperature of the roof reaches a predetermined value and shutting off the flow after a predetermined temperature drop and substantially before the temperature of said surface falls below that value at which sensible cooling by evaporation ceases.

11. The method of cooling a roof having a surface exposed to atmospheric conditions and a set of spray means constructed and arranged to distribute liquid in a fine spray uniformly over said surface, which comprises permitting flow of said cooling liquid to said spray means at a rate not exceeding .010 gallon per square foot per minute when the temperature of the roof reaches a predetermined value and shutting off the flow after a predetermined temperature drop and before the temperature of said surface falls below that value at which sensible cooling by evaporation ceases.

12. The method of cooling a roof having a surface exposed to atmospheric conditions and a set of spray means constructed and arranged to distribute liquid in a fine spray uniformly over said surface, which comprises permitting flow of said cooling liquid to said spray means at a rate not exceeding .005 gallon per square foot per minute when the temperature of the roof reaches a predetermined value and shutting off the flow after a predetermined temperature drop and before the temperature of said surface falls below that value at which sensible cooling by evaporation ceases.

13. The method of cooling a roof having a surface exposed to atmospheric conditions and a set of spray means constructed and arranged to distribute liquid in a fine spray uniformly over said surface, which comprises permitting flow of said cooling liquid to said spray means at a rate not exceeding .001 gallon per square foot per minute when the temperature of the roof reaches a predetermined value and shutting off the flow after a predetermined temperature drop and before the temperature of said surface falls below that value at which sensible cooling by evaporation ceases.

14. The method of cooling a roof having a surface exposed to atmospheric conditions and a set of spray means constructed and arranged to distribute liquid in a fine spray uniformly over said surface, which comprises permitting flow of said cooling liquid to said spray means when the temperature of the roof reaches approximately 90° F. and shutting off the flow after a predetermined temperature drop and before the temperature of said surface falls below that value at which sensible cooling by evaporation ceases.

15. The method of cooling a roof having a surface exposed to atmospheric conditions and a set of spray means constructed and arranged to distribute liquid in a fine spray uniformly over said surface, which comprises permitting flow of said cooling liquid to said spray means when the temperature of the roof reaches approximately 90° F. and shutting off the flow after a predetermined temperature drop of at least 5° F. and before the temperature of said surface falls below that value at which sensible cooling by evaporation ceases.

16. The combination with a roof having a surface exposed to atmospheric conditions, of a system for spraying such surface with a cooling liquid, said system comprising a set of spray means constructed and arranged to distribute said liquid substantially uniformly over said surface, means for supplying said liquid to said spray means and valve structure for controlling the flow to said spray means and including an element for stopping said flow, and a valve operating device including a thermostatic means mounted to be exposed to said atmospheric conditions acting to operate said valve element to permit the flow of said cooling liquid when the temperature of the roof reaches a predetermined value and to shut off such flow before the temperature of said surface falls below that value at which said liquid would collect as a substantial puddle or stream.

17. The method of cooling a roof having a surface exposed to atmospheric conditions and a set of spray means constructed and arranged to distribute liquid in a fine spray uniformly over said surface, which comprises permitting flow of said cooling liquid to said spray means when the temperature of the roof reaches a predetermined value and shutting off the flow after a predetermined temperature drop and before the temperature of said surface falls below that value at which said liquid would collect as a substantial puddle or stream.

LEONARD H. HOLDER.